May 8, 1956   P. L. TAYLOR   2,744,983
PERFORATED ARC CHUTE BARRIER PROVIDING PARALLEL ARC PATHS
Filed Oct. 3, 1951   6 Sheets-Sheet 1

Inventor
Philip L. Taylor
by Warren F. B. Lindsley
Attorney

May 8, 1956 P. L. TAYLOR 2,744,983
PERFORATED ARC CHUTE BARRIER PROVIDING PARALLEL ARC PATHS
Filed Oct. 3, 1951 6 Sheets-Sheet 2

Inventor
Philip L. Taylor
by Warren F. B. Lindley
Attorney

May 8, 1956  P. L. TAYLOR  2,744,983
PERFORATED ARC CHUTE BARRIER PROVIDING PARALLEL ARC PATHS
Filed Oct. 3, 1951  6 Sheets-Sheet 3

Inventor
Philip L. Taylor
by Warren F. B. Lidgley
Attorney

Inventor
Philip L. Taylor
by Warren F. B. Lindsley
Attorney

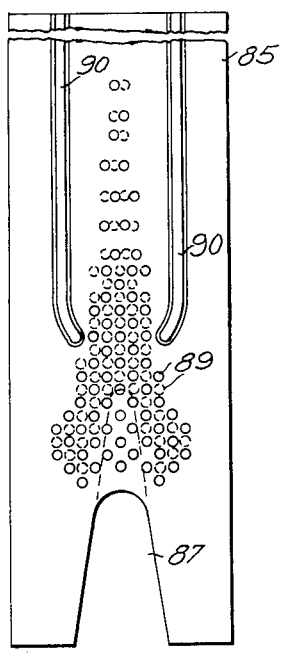
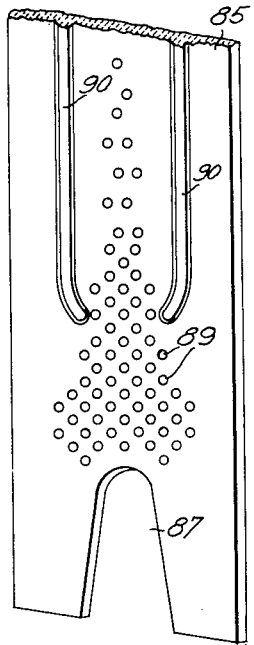
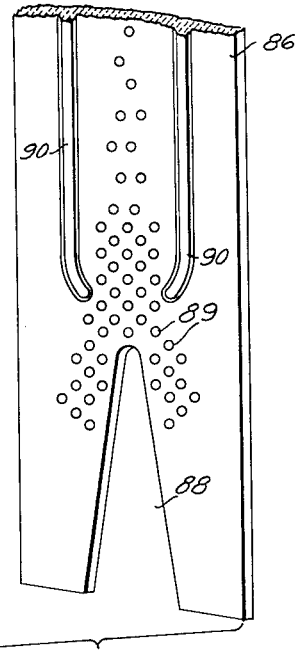
Fig. 15　　　　　　Fig. 14
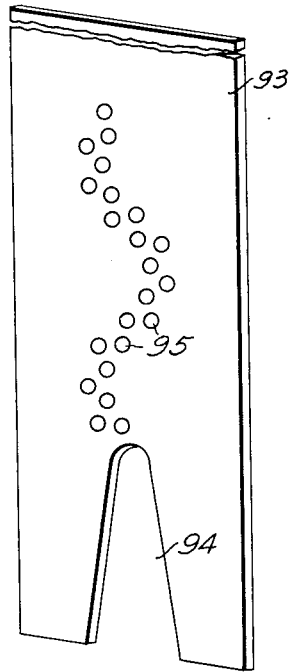
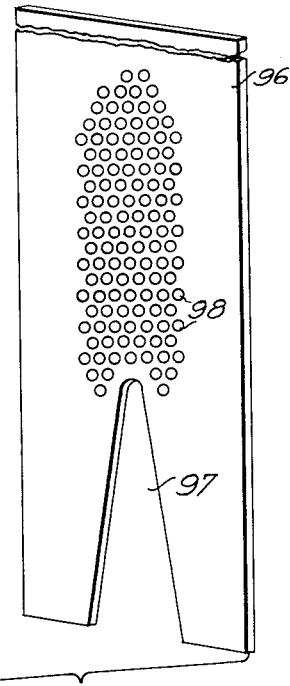
Fig. 17　　　　　　Fig. 16
Fig. 18

United States Patent Office 2,744,983
Patented May 8, 1956

2,744,983

PERFORATED ARC CHUTE BARRIER PROVIDING PARALLEL ARC PATHS

Philip L. Taylor, Abington, Mass., assignor to Allis-Chalmers Manufacturing Company, Milwaukee, Wis.

Application October 3, 1951, Serial No. 249,566

17 Claims. (Cl. 200—144)

This invention relates to circuit interrupting devices and more particularly to arc extinguishing means for use in connection therewith.

In the construction and operation of alternating current circuit interrupters, it is frequently necessary to provide means for extinguishing quickly the arc which is drawn between separable arcing contacts. This arc is usually blown by blowout means, such as a magnetic blowout coil or an air blast into an arc chute which is arranged to quench the arc by lengthening it, cooling it, or a combination of both.

Arc chutes having spaced insulating plates to lengthen the arc or squeeze the arc into narrow slots have been used to rapidly increase the arc voltage, decrease the arc current and improve the power factor, thereby facilitating interruption of the arc at a current zero. However, it has been found in many cases that the arc voltage developed by the arc chute was not the most favorable for interrupting the power circuit.

The geometry of the arc chute is an important factor in determining the arc voltage which will be developed for circuit interrupting purposes. This arc voltage can be expressed as a percentage of the line voltage and therefore is not limited to any particular voltage class of breaker.

Therefore, in accordance with the invention claimed, an arc chute having a predetermined geometrical configuration is provided adjacent a pair of arcing contacts for receiving the arc at one end thereof and exhausting the deionized arcing products at the other end thereof. The arc chute employs an arc extinguishing device comprising a plurality of spaced insulating plates arranged to extend longitudinally of the axis of the arc chute and providing openings adjacent the arcing contacts to form an arc passage. The openings may form a slot arranged to gradually restrict the arc until it is reduced to a predetermined cross sectional area at the closed end of the slot after which perforations are used to complete the conversion to convert the arc from a relatively high current arc having a relatively low arc voltage into a relatively low current arc having a relatively high arc voltage. Thus, the arc current is limited until the next passage of the current through the zero point of its cycle, at which point it should become extinguished by failure to reignite.

A number of the plates are provided with a plurality of spaced apertures, all having a predetermined cross sectional area substantially equal to, or smaller than the cross sectional area of the arc at the closed end of the slot, for providing a plurality of secondary arc passages for the constricted arc. The particular cross sectional area of the apertuers is directly related to the thickness of the barrier plates, plate spacing, current and voltage gradient to be interrupted. The apertures may be arranged in a variety of patterns to lengthen and cool the arc but in accordance with this invention they are arranged in one or more clusters which are elongated along the length of the insulating plates in the direction of arc propagation. The apertures may also be arranged in clusters with groups of apertures at equal distancse from the zone of arc initiation. The apertures so arranged subdivide a part of a high current large diameter arc into a plurality of low current small diameter arc branches. These low current small diameter arc branches are in parallel with each other when they pass through one or more contiguous groups of the apertures.

It is, therefore, one object of the present invention to provide a new and improved arc interrupting device in which the arc is constricted in a predetermined manner as it passes through an arc chute.

Another object of this invention is to provide a new and improved arc extinguishing device in which a relatively high current arc having a relatively low arc voltage is transformed into a relatively low current arc having a relatively high arc voltage to rapidly and efficiently extinguish the arc.

Another object is to provide a novel and effective means for introducing an arc into an arc chute plate structure.

A further object of this invention is to provide a new and improved arc extinguishing device in which the arc is divided into parallel arc sections.

A still further object of this invention is to provide an arc chute which controls the arc current and arc voltage to rapidly interrupt the arc in a manner heretofore unknown.

Objects and advantages other than those set forth will be apparent from the following description, when read in connection with the accompanying drawings, in which:

Figs. 4, 6, 8, 10, 12, 14 and 16 are exploded views of modifications of the barrier plate assembly illustrated in Fig. 2;

Figs 5, 7, 9, 11, 13, 15 and 17 are end views of the groups of barrier plates illustrated in Figs. 4, 6, 8, 10, 12, 14 and 16, respectively;

Fig. 18 is a top view of one of the barrier plates of Fig. 14;

Figure 1:
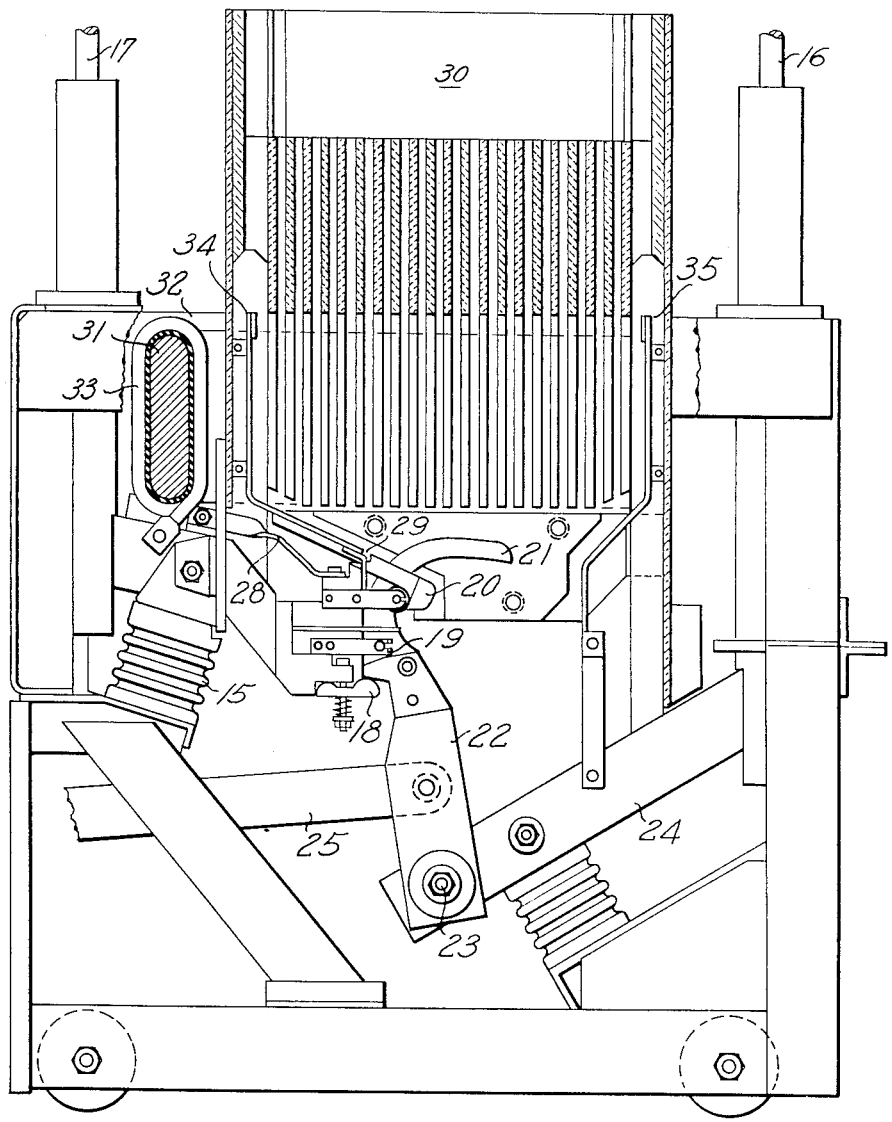
Fig. 1 is a view in a cross section, of a magnetic blowout type circuit breaker employing the present invention.

Referring more particularly to the drawings by characters of reference, Fig. 1 illustrates a magnetic blowout type of circuit breaker including as elements thereof a pair of terminal studs 16 and 17 for connecting the circuit breaker to line conductors (not shown). Although in general, circuit breakers of the type considered in Fig. 1 are provided with a plurality of similar pole structures, one for each phase of a polyphase electric circuit, only one such pole structure is shown in the drawing and the circuit breaker will be described in detail as if it was of the single pole unit type.

The circuit interrupter or breaker in Fig. 1 comprises essentially means for opening the circuit to form the interrupting arc and an arc extinguishing structure. Specifically, the circuit opening means comprises a fixed contact assembly supported on an insulator 15 and including a current carrying contact 18, tertiary contacts 19, and arcing contact 20, cooperating with a movable contact 21 comprising current carrying, tertiary and arcing contact combined in a single structure. Arcing contact 21 is mounted on a lever 22 which is pivotally mounted at 23 on an extension 24 of the circuit breaker stud 16 and is operated by means of a reciprocally movable rod 25. The operating rod 25 is suitably connected to an actuating mechanism (not shown) for operating the movable contact between closed and open circuit positions. Fig. 1 illustrates the movable contact 21 in closed position. The arcing contacts are electrically connected to the lower ends of terminal studs 16 and 17. Accordingly, when the breaker is connected in series in a power circuit and the arcing contacts are separated, an arc may be initiated across the gap formed between the contacts.

For interrupting this power arc, an arc extinguishing structure, such as an arc chute 30, may be mounted so as to receive the power arc which is under the influence of a magnetic blowout means, extinguish the arc, and exhaust the arcing products therefrom. The arc chute preferably is disposed directly above the arcing contacts, as shown, when the blowout means act upward, but may be mounted in any other suitable location when the blowout means act in other directions. The switch or arcing contacts and the magnetic blowout structure can assume any preferred form so that a brief description thereof will be sufficient. The magnetic blowout means may comprise a core 31, poles 32, and a coil 33. The latter is electrically connected to the terminal stud 17 and, through a strap 28, to arcing contacts 20 and to a metallic arc runner 34 so that the arc current (as the arc travels along the runner) flows through the blowout coil in a manner well known in the art.

Normally the current is carried in the closed circuit position of the breaker by contact 21 and the spring biased contact 18. While the movable arcing contact 21 is actuated to open circuit position, current is shunted from fixed contact 18 first to fixed contact 19 and then to fixed arcing contact 20. As the arc is drawn by the movable arcing contact 21, the arc terminal on arcing contact 20 is transferred to arc runner 34 which is adjacent to and connected to contact 20 but separated therefrom by a gap 29. The arc terminal is driven across gap 29 to reach a flat side of arc runner 34. When the movable arcing contact 21 approaches a predetermined position in its opening stroke, the other arc terminal transfers from the movable arcing contact 21 to an arc runner 35 which directs the arc into the arc chute 30. When the movable arcing contact 21 parts from contact 19, the flow of current is transferred from contact 19 to contacts 20 through the blowout coil 33. The movable arcing contact 21 subsequently parts from contact 20 to draw an arc. Accordingly, the blowout coil is already energized at the inception of the arc interruption to influence the arc in a well known manner, i. e., to drive it into the arc chute in an expanding loop. It will be apparent to one skilled in the art that the blowout field can be utilized in the most efficient manner by disposing the iron poles 32 so as to cooperate with the blowout coil in the conventional manner outside of the arc chute.

In accordance with the invention claimed, arc chute 30 is provided with a plurality of slotted or perforated spaced insulating barrier plates 36 and 37 (more clearly shown in Figs. 2 and 3) arranged to extend longitudinally of the axis of arc chute 30. The most advantageous values for the thickness and the spacing of the barrier plates are determined by experiment. It has been found that the barrier plates are preferably 1/8" to 3/16" thick and spaced 3/16" apart in circuit breakers for interrupting alternating currents up to 50,000 amperes at 2,500 volts. Each of barrier plates 36 and 37 is provided with a wide mouthed V-shaped slot 38 arranged adjacent the arcing contacts to form an arc passage 39. The closed end of slot 38 is formed as a narrow elongated U-shaped portion. These barrier plates are arranged in a plurality of groups which restrict the arc as it moves toward the exhaust end of the arc chute. Each group may comprise a first barrier plate 36 and a second barrier plate 37.

The cluster of holes or apertures 42 provided in barrier plates 36 and 37 are arranged to break up a portion of the arc into a plurality of branches in parallel. The holes or apertures are relatively small and are arranged relatively close to each other. Their total circumference and area may be smaller than the circumference and cross sectional area of the arc at the time it reaches the cluster area. Further, the average spacing between the apertures is considerably smaller than the diameter of the high current arcs formed at the zone of arc initiation and the average size of the apertures is considerably smaller than the average spacing between the centers of the apertures. A number of apertures in the cluster are arranged in groups of which all apertures forming a part thereof are at equal distances from the zone of arc initiation.

The barrier plates may be arranged in groups having the sequence 36, 37; 36, 37, etc., or they may be mounted in any other sequence, for example, plates 36, 36; 37, 37, etc.

Under normal interrupting conditions an arc is initiated immediately upon separation of the arcing contacts 20 and 21. The terminal of the arc on fixed arcing contact 20 is driven over arc runner 34 by the magnetic blowout means and the thermal effect of the arc. As movable arcing contact 21 nears its fully open position the other terminal of the arc is moved from contact 21 to arc runner 35 and is also driven by the blowout means and the thermal effect of the arc toward the exhaust end of arc chute 30.

As the arc terminals move along the arc runners 34 and 35 toward the exhaust end of arc chute 30, the arc is driven into passage 39 formed by the slots 38 of the barrier plates.

The arc rises in passage 39 under the influence of the blowout means and the thermal effect of the arc and is constricted by the inverted V-shaped slot 38. The sides of slot 38 are arranged to effect sufficient arc constriction to convert high current arcs into lower current arcs. The narrow U-shaped slot portion retains the arc's constricted size during movement of the arc through such portion. This pretreatment of the arc results in a higher arc voltage. High arc voltage is a relative term, but in this disclosure it means a voltage in excess of thirty percent of the circuit voltage of the line being interrupted. Voltages substantially above thirty percent of the circuit or line voltage are desirable because they result in reduced arc energy. High arc voltage may be achieved in the barrier plate slot, but if not it will be achieved in the plurality of apertures arranged adjacent the closed end of the slot.

Apertures 42 are so arranged that they subdivide a portion of a high current large diameter arc into a plurality of low current small diameter arc branches in parallel. Two arc branches in parallel are formed where there are two distinct gaseous passages with an intervening insulating barrier. The resistances of two gaseous passages and the rates at which deionization occurs therein are never absolutely equal particularly if they are vertically disposed. As a consequence of these facts, one arc branch tends to draw more current and will finally carry all the current, while the other arc branch ceases to exist. During the transitory period during which two arc branches in parallel coexist cooling and deionization occurs at a much more rapid rate than possible if the current is carried by one arc only. This is due to the fact that the ratio of circumference to cross sectional area of two arc branches carrying together a given current is considerably larger than the ratio of circumference to cross sectional area of one single arc carrying the same current $i$. In other words, subdividing the arc into parallel branches greatly increases the deionizing and heat exchange areas and is thus highly effective in increasing the arc voltage and in expediting circuit interruption.

By arranging groups of apertures substantially equally spaced from the zone of arc initiation, the possibility of dividing the arc into parallel arc sections is greatly increased. The arc is inclined to spread or flatten out in a direction perpendicular to the axis of the arc chute as it passes therethrough under the biasing effect of the magnetic coil 33. Each pair of parallel arc branches is unstable but because of the cluster arrangement of apertures a pair of new arc branches in parallel will be formed in a plurality of apertures spaced at approximately equal distance from the zone of arc initiation downstream from the first pair of apertures. Thus, arcs in parallel may coexist during a substantial period of the interrupting process, resulting in a great increase in the effectiveness of the interrupting structure.

Figure 3:
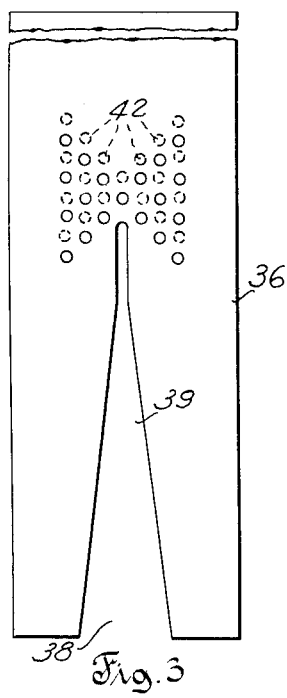
Fig. 3 is an end view of the group of barrier plates illustrated in Fig. 2.
Figure 2:
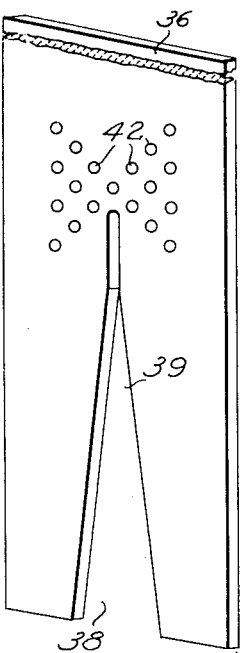
Fig. 2 is an exploded view of one group of barrier plates which may be stacked and used in the structure of Fig. 1.
Figure 2:
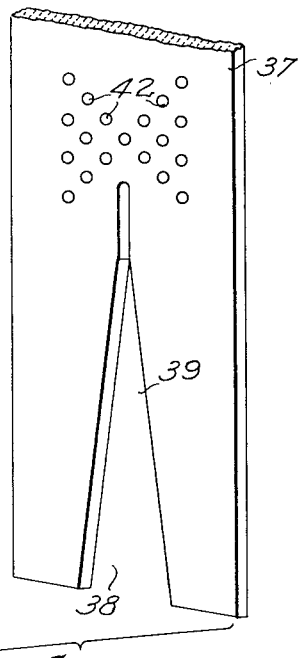
Figure 5:
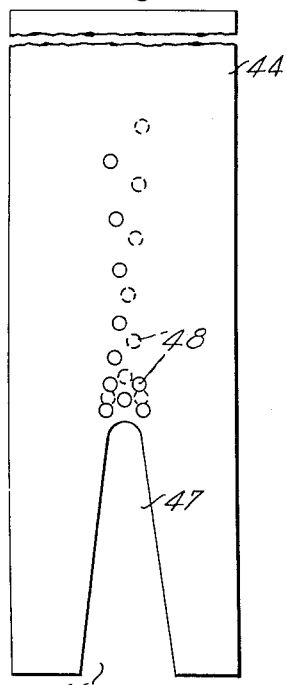
Figure 4:
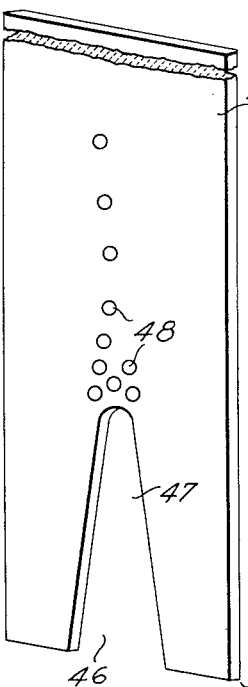

Figs. 4 and 5 illustrate a modification of the barrier plate structure shown in Figs. 2 and 3. Barrier plates 44 and 45 have a V-shaped notch 46 providing an arc passage 47. Each barrier plate is provided with a plurality of apertures 48 which are arranged in clusters. Some of the apertures 48 are arranged at equal distances from the zone of arc initiation, thus materially aiding the barrier plates in subdividing the arc as it passes through the arc chute. It will be observed that the number of holes in the cluster decrease in the direction of arc propagation. Such an arrangement may be used on account of the progressively decreasing strength of the arc current as it passes through the arc chute.

Figures 6, 7:
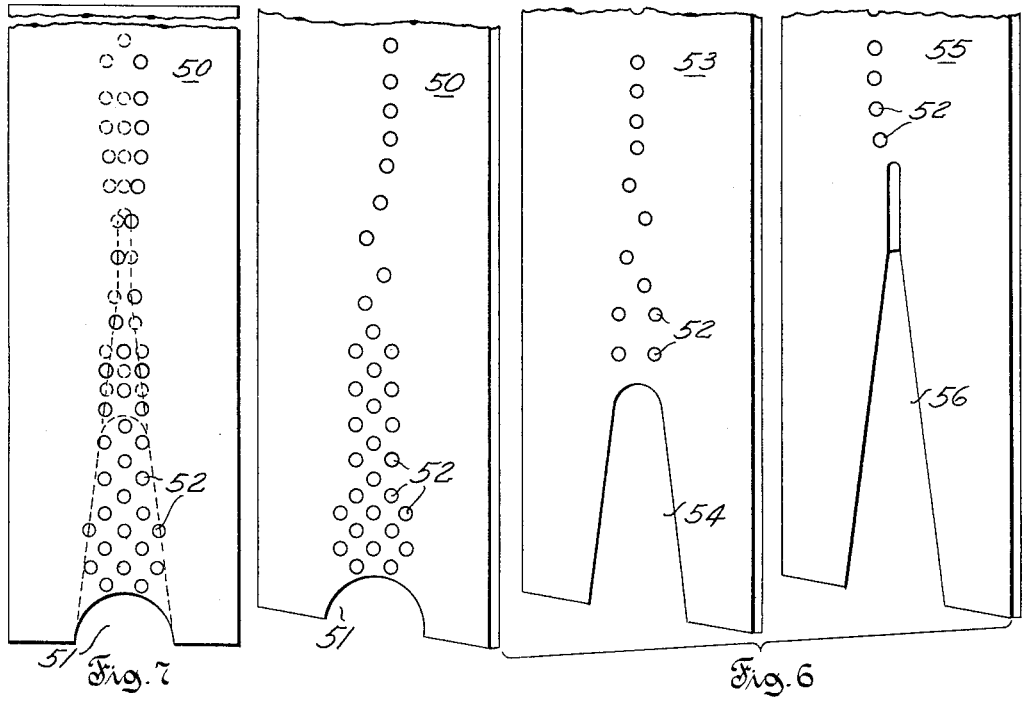

Figs. 6 and 7 illustrate another modification of the barrier plate structure shown in Figs. 2 and 3. Barrier plate 50 has a semicircular slot 51 with a cluster of holes or apertures 52 arranged adjacent thereto. The majority of apertures are arranged near the closed end of the slot and progressively decrease in number toward the exhaust end of the barrier plate. A number of the apertures are spaced at equal distances from the zone of arc initiation. Plate 53 is provided with a slot 54 of the type illustrated in plate 44 of Fig. 4 and the apertures 52 are arranged in a cluster near the closed end of the slot with a number of the apertures arranged at equal distances from the closed end of slot 54. Plate 55 is provided with a slot 56 of the type illustrated in plate 36 of Fig. 2. Apertures 52 extend from the slot in a line toward the exhaust end of the barrier plate.

The slot 51 in the plate 50 is an arc centering slot, i. e., a slot of which the main purpose is to center the arc in the plane of symmetry of the arc chute. This slot has a relatively limited arc constricting and cooling action. The slot 56 in the plate 55 is an arc constricting slot designed to drastically reduce the cross section of the arc to filamentary proportions. The front plate provided with a cluster of holes breaks up the high current arc into a plurality of parallel arc branches and thus greatly helps in producing a filamentary arc in the upper part of the slot of the plates 53 and 55. The plates 53 and 55 are provided with a series of holes which extend in the direction of arc propagation. The purpose of these holes is to compel a progressive transfer of the filamentary arc from the slot end in the plates 53 and 55 to a first hole and then from hole to hole to deionize and cool the filamentary arc to the point where complete extinction must occur. The plate 50 may be provided with holes that extend in the direction of arc propagation down to the same level as the holes in the plates 53 and 55. At the level where there are holes in both the front and rear plates, these holes are preferably out of registry to cause elongation of the arc along a substantially horizontal zigzag path.

Figures 8, 9:
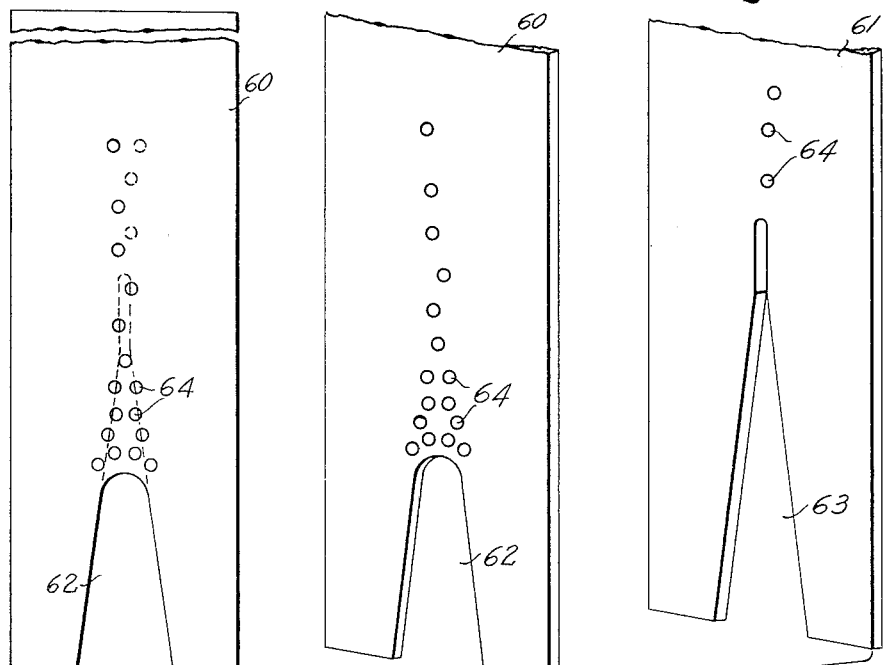

Figs. 8 and 9 illustrate a modification of the barrier plate structure shown in Figs. 6 and 7. This group comprises only two different barrier plates 60 and 61 having slots 62 and 63, respectively, and apertures 64.

Figures 10, 11:
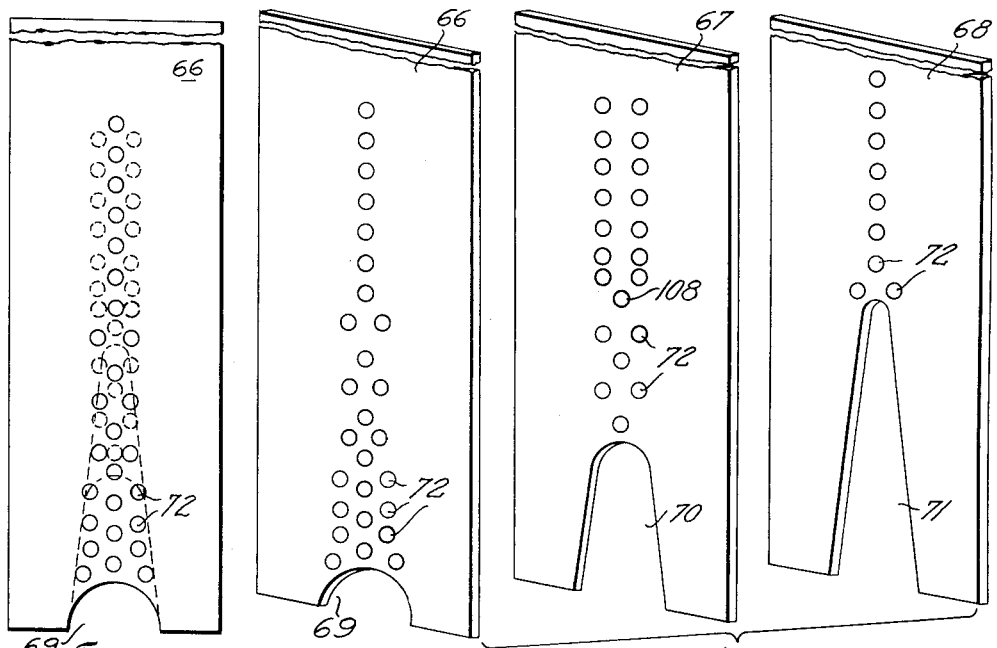

Figs. 10 and 11 illustrate a further modification of Figs. 6 and 7 showing three plates 66, 67 and 68 having slots 69, 70 and 71, respectively, and all provided with a plurality of apertures 72. As shown the apertures 72 of plate 67 form a multiple peak at the exhaust end of the plate. The object of the multiple peak is to limit the duty of that portion of the plate which lies beyond the fork 108 in the path of arc travel or arc progression defined by the apertures. Whether the arc travels past the fork to the left or right is a random matter, the thermal duty of both the left and the right arc path and the erosion of the holes is reduced.

Figures 12, 13:
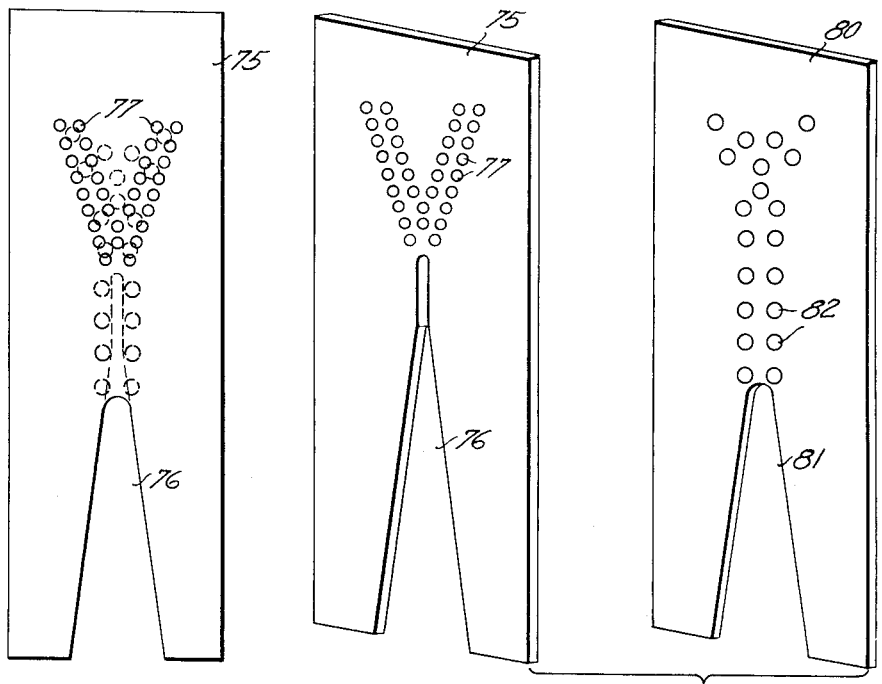

Figs. 12 and 13 illustrate a further modification of the group of barrier plates illustrated in Figs. 1 to 11 comprising barrier plates 75 and 80. Plate 75 is provided with a slot 76 and a cluster of apertures 77 extending in parallel lines from the closed end of slot 76 toward adjacent corners of the barrier plate near the exhaust end thereof. Plate 80 comprises a V-shaped slot 81 and two rows of apertures 82 extending from the closed end of slot 81 toward the center of the exhaust end of the barrier plate on opposite sides of the longitudinal axis of the plate. At the exhaust end of the barrier plate the rows of apertures flare out toward the corners of the exhaust end of the plate.

Figs. 14 and 15 illustrate a group of slotted ribbed barrier plates 85 and 86 comprising slots or notches 87 and 88, respectively, apertures 89 and rib members 90 forming an integral part of and projecting from the plane of plates 85 and 86 on either side of a part of the cluster of apertures 89. The number of apertures per unit of area decreases in the direction away from the apex of notches 87, 88 toward the exhaust end of the arc chute. Ribs 90 define a channel of varying cross sectional area. These ribs extend between adjacent plates and deionize, trap and cool a substantial part of the products of arcing passing between the barrier plates toward the exhaust end of the arc chute structure. The ribs 90 may be curved at the ends near the apex of the notches 87 and 88 for deflecting the arc products away from the median plane of the arc chute. It is desirable to deflect the arc products away from the median plane of the chute to cause them to come in relatively intimate contact with the large lateral walls of the chute where rapid cooling and deionization by surface action takes place.

Figs. 16 and 17 illustrate a modification of Figs. 1 and 2, wherein barrier plate 93 is provided with a slot 94 and a cluster of apertures 95 forming parallel serpentine lines extending from the closed end of slot 94 toward the center of the exhaust end of the barrier plate. Barrier plate 96 is provided with a slot 97 and a cluster of apertures 98.

Figures 19, 20:
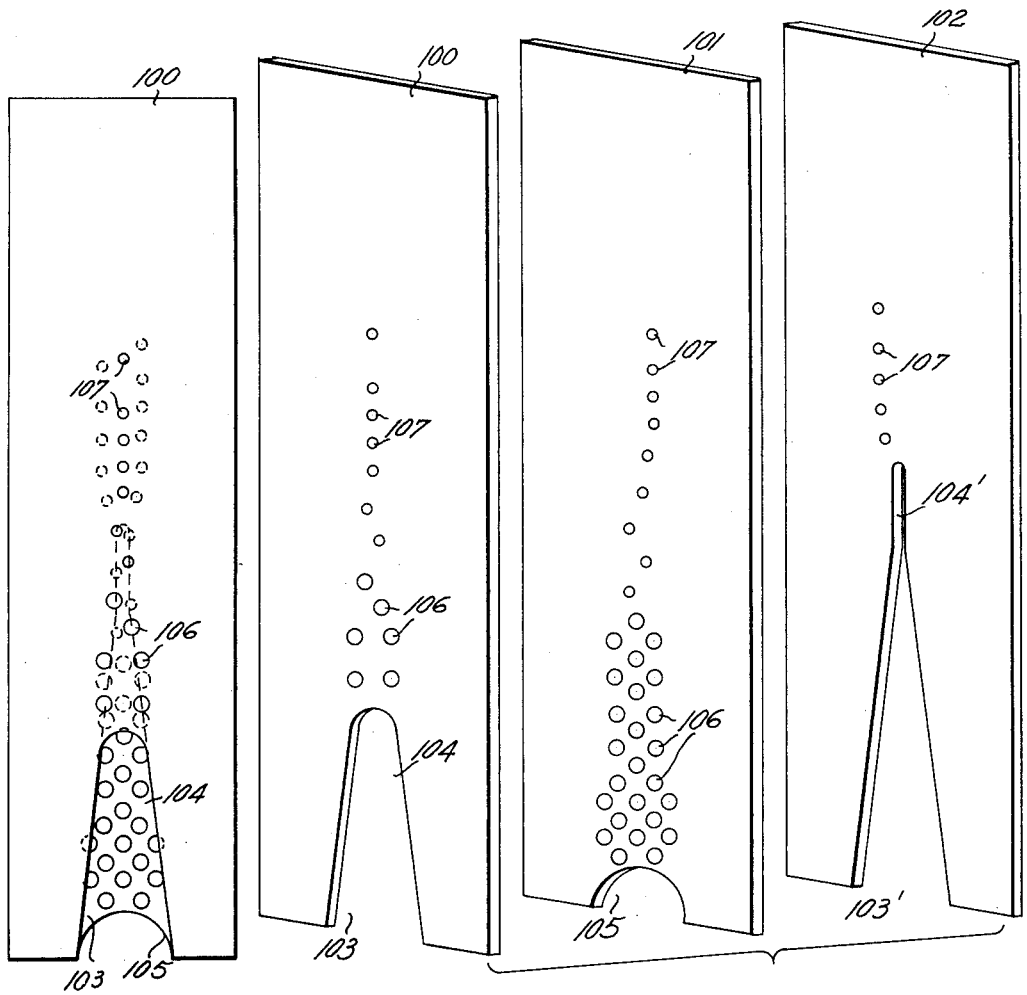
Fig. 19 is another exploded view of a group of barrier plates which may be stacked and used in the structure of Fig. 1.
Fig. 20 is an end view of the group of barrier plates illustrated in Fig. 19.

Figs. 19 and 20 illustrate another group of barrier plates 100, 101 and 102, which may be used in the arc chute structure shown in Fig. 1. As shown in Fig. 19 these barrier plates are arranged in groups of three plates so placed that the outer plates of each group have a substantially V-shaped slot with a wide open end 103 and $103^1$ and a narrow closed end 104 and $104^1$. The inner plate 101 has an arc centering slot or notch 105. Plate 101 has a cluster of holes 106 arranged directly opposite the wide open ends of the V-shaped slots of plates 100 and 102. The arc as it enters the wide open ends 103 and $103^1$ of the V-shaped slot in each of the other plates 100 and 102 is constricted and is simultaneously subdivided into a plurality of arclets or parallel arc branches by the cluster of holes 106 in plate 101.

The average spacing between the perforations or holes 106 in plate 101 is considerably smaller than the width of the V-shaped slot in plates 100 and 102 at the region of the slots opposite the cluster of perforations or holes 106. The size of the perforations or holes 106 are generally a small fraction of the average spacing between their centers.

Another cluster of perforations or holes 107 is provided in each of the plates 100, 101 and 102. These additional holes 107 are situated in the region remote from the open slot ends of plates 100, 101 and 102 and beyond the closed slot ends of plates 100 and 102. As shown, the additional holes 107 may be smaller in size than holes 106 in plate 101.

In each of the groups of barrier plates illustrated, the apertures are arranged so that a number of them are spaced at equal distances from the zone of arc initiation so that they may encourage the formation of parallel arc branches, thereby aiding in rapidly extinguishing the arc.

In commercial use the barrier plates illustrated in the drawings may be stacked in sequences different from the ones shown. One preferred arrangement is to stack the plates so that the holes in an intermediate plate are arranged at and above the level of the closed arc restraining portion of the V-shaped slots in the adjacent plates. The intermediate plate may also have a cluster of holes arranged directly opposite the wide open ends of the V-shaped slots in the adjacent plates. In some of the plates the cluster of holes may extend from the region immediately adjacent the region of arc inception and extend to that part of the plate where arc extinction occurs. The number of holes per unit of height of some of the plates may decrease with increasing distance from the region of arc inception or the zone at which the arc enters the chute. This arrangement of holes may form a triangular or tree pattern, extending from the region of the apex of the notch or slot to the region of final arc extinction in the chute. The width of the pattern decreases with increasing distance from the region of the apex of the notch.

The holes in some of the plates are arranged in a cluster relatively close to the arc entrance zone of the arc chute, namely near the zone of the arc centering slot or notch. This cluster of holes converts a portion of the high current arc into a plurality of parallel low current arc branches. A second cluster of holes may be arranged in this plate relatively remote from the arc entrance zone for further deionization of the low current parallel branch arc sections and to effect final arc extinction. The spacing between the holes in the first cluster may be considerably smaller than the diameter of the high current arc at the entrance zone of the arc chute and the average size of the holes may be considerably smaller than the average spacing between hole centers.

Although only a few embodiments of the present invention have been illustrated and described, it will be apparent to those skilled in the art that various changes and modifications may be made therein without departing from the spirit of the invention or from the scope of the appended claims.

Features disclosed but not claimed herein are claimed in application Serial No. 180,258 of Julius W. Timmerman, filed August 5, 1950, now abandoned, and in Patents U. S. 2,652,469 of Donald E. Weston, granted September 15, 1953; U. S. 2,724,754 of Julius W. Timmerman, granted November 22, 1955, and U. S. 2,738,398 of Philip L. Taylor, granted March 13, 1956.

It is claimed and desired to secure by Letters Patent:

1. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plates being provided with a cluster of apertures adjacent the closed end of said slots for subdividing the constricted relatively high current arc into a plurality of relatively low current small diameter arcs in parallel with each other to rapidly cool and extinguish the arc, said cluster comprising a plurality of apertures being equally spaced from the zone of arc initiation.

2. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plates being provided with a cluster of apertures adjacent the closed end of said slots for subdividing the constricted relatively high current arc into a plurality of relatively low current small diameter arcs in parallel with each other to rapidly cool and extinguish the arc, said cluster comprising a first group of apertures equally spaced a first predetermined distance from the zone of arc initiation and a second group of apertures equally spaced a second predetermined distance from the zone of arc initiation.

3. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plates being provided with a cluster of apertures of substantially equal cross sectional area adjacent the closed end of said slots for subdividing the constricted relatively high current arc into a plurality of relatively low current small diameter arcs in parallel with each other to rapidly cool and extinguish the arc, said cluster comprising a plurality of groups of apertures, a number of apertures of each group being equally spaced from the zone of arc initiation.

4. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plates being provided with a cluster of apertures of substantially equal cross sectional area adjacent the closed end of said slots for subdividing the constricted relatively high current arc into a plurality of relatively low current small diameter arcs in parallel with each other and extending in straight lines from said slot toward the exhaust end of said chute for providing arc passages to rapidly cool and extinguish the arc, a number of apertures of each of said cluster being equally spaced from the zone of arc initiation.

5. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plates being provided with a cluster of apertures of substantially equal cross sectional area adjacent the closed end of said slots for subdividing the constricted relatively high current arc into a plurality of relatively low current small diameter arcs in parallel with each other to rapidly cool and extinguish the arc, said cluster comprising a plurality of groups of apertures some of which are spaced the same distance from the zone of arc initiation and in which the apertures of each group are arranged in different crisscrossing straight lines diverging from the slot of each plate toward a corner of the plate near the exhaust end of said chute.

6. An electric circuit interrupter comprising arcing contacts for initiating an arc and an arc chute for receiving and extinguishing the arc, said chute comprising a plurality of slotted spaced insulating plates arranged to extend longitudinally of the axis of said chute with the slots adjacent said arcing contacts to form an arc passage, said slots gradually restricting the high current arc as it moves through said chute to a predetermined cross sectional area, some of said plurality of plates being provided with a cluster of apertures of substantially equal cross sectional area adjacent the closed end of said slots for subdividing the constricted relatively high current arc into a plurality of relatively low current small diameter arcs in parallel with each other to rapidly cool and extinguish the arc, said cluster comprising a plurality of apertures equally spaced from the zone of arc initiation, and a pair of spaced ribs projecting from the plane of each of said some of said plurality of plates and extending longitudinally of the axis of said chute, said ribs being arranged on either side of said apertures to increase the deionizing action of said plates.

7. An electric circuit interrupter comprising separable contacts for initiating an arc and an arc chute for receiving and extinguishing said arc, said chute comprising a plurality of spaced insulating plates arranged transversely with respect to the general direction of separation of said contacts, arc centering means on some of said plates immediately adjacent to the zone where said arc is initiated, and clusters of apertures in some of said plates in the region thereof situated immediately adjacent to said zone where said arc is initiated, the average spacing between said apertures being considerably smaller than the diameter of high current arcs formed at said zone where said arc is initiated, and the average size of said apertures being considerably smaller than the average spacing between the centers of said apertures.

8. An electric circuit interrupter comprising separable contacts for initiating an arc and an arc chute for receiving and extinguishing said arc, said chute comprising a plurality of spaced insulating plates arranged transversely with respect to the general direction of separation of said contacts, said plurality of spaced insulating plates including at least a group of three plates comprising a pair of outer plates each having a substantially V-shaped slot with a wide open end and a narrow closed end and an inner plate having a cluster of holes therein arranged directly opposite said wide open end of said slot in each of said pair of plates whereby said arc is constricted as it enters said wide open ends of said slot in each of said pair of outer plates and whereby said arc is simultaneously subdivided into a plurality of arclets in parallel at the region of said cluster of holes.

9. An electric circuit interrupter comprising separable contacts for initiating an arc and an arc chute for receiving and extinguishing said arc, said chute comprising a plurality of spaced insulating plates arranged transversely with respect to the general direction of separation of said contacts and including at least one group of three plates wherein each of the two outer plates has a substantially V-shaped slot with a wide open end and a narrow closed end and wherein the inner plate has a cluster of perforations arranged opposite to the wide open end of said slot in each of said outer plates, the average spacing between said perforations being considerably smaller than the width of said slot in each of said two outer plates at the region thereof opposite said cluster of perforations and the size of said perforations being a small fraction of the average spacing of the centers thereof.

10. An electric circuit interrupter comprising separable contacts for initiating an arc and an arc chute for receiving and extinguishing said arc, said chute comprising a plurality of spaced insulating plates arranged transversely with respect to the general direction of separation of said contacts, said plurality of plates including at least one group of three plates having at the two outer plates thereof substantially V-shaped slots with wide open ends and narrow closed ends and having at the inner plate thereof a cluster of holes arranged opposite to said wide open ends, and a plurality of additional holes arranged on at least one of said plates of said group at a zone thereof more remote from said wide open ends than said cluster of holes, the hole size of said plurality of additional holes being smaller than the hole size of said cluster of holes.

11. An electric circuit interrupter comprising separable contacts for initiating an arc and an arc chute for receiving and extinguishing said arc, said chute comprising a plurality of spaced insulating plates arranged transversely with respect to the general direction of separation of said contacts, said plurality of plates including at least one plate having a shallow arc centering notch and an adjacent plate having a considerably deeper arc constricting notch including a relatively wide region for deionizing high current arcs and a relatively narrow region for deionizing low current arcs, and a cluster of holes in said one plate in the region of the apex of said shallow notch and opposite to said wide region of said arc constricting notch.

12. An electric circuit interrupter comprising separable contacts for initiating an arc and an arc chute for receiving and extinguishing said arc, said chute including a plurality of spaced insulating plates arranged transversely with respect to the general direction of separation of said contacts, a notch in some of said plurality of plates adapted to receive high current arcs and of sufficient depth to permit substantial travel and constriction of high current arcs therein, and a cluster of holes in said some of said plurality of plates extending over a region situated above and below the apex of said notch, the number of holes per unit of height of said some of said plates decreasing with increasing distance from the zone of arc inception in said chute.

13. An electric circuit interrupter comprising separable contacts for initiating an arc and an arc chute for receiving and extinguishing said arc, said chute including a plurality of spaced insulating plates arranged transversely with respect to the general direction of separation of said contacts, an arc receiving notch in some of said plurality of plates, ribs forming an integral part of and projecting from the plane of each of said some of said plurality of plates for cooling and directing the products of arcing formed in said chute in the direction from the arc inception region to the exhaust region thereof, and a cluster of holes in each of said some of said plurality of plates extending from the region of the apex of said notch adjacent said ribs.

14. An electric circuit interrupter comprising separable contacts for initiating an arc and an arc chute for receiving and extinguishing said arc, said chute including a plurality of spaced insulating plates arranged transversely with respect to the general direction of separation of said contacts, an arc receiving notch in some of said plurality of plates, a pair of spaced ribs projecting from the plane of each of said some of said plurality of plates, said pair of ribs being curved at the end thereof adjacent the apex of said notch to deflect the flow of products of arcing away from the median plane of said plurality of plates, and a cluster of holes in each of said some of said plurality of plates extending from the region of said apex of said notch into the space between said pair of ribs, the number of holes per unit of area decreasing in the direction away from said apex of said notch toward the exhaust end of said chute.

15. An electric circuit interrupter comprising separable contacts for initiating an arc and an arc chute for receiving and extinguishing said arc, said chute comprising a plurality of spaced insulating plates arranged transversely with respect to the general direction of separation of said contacts, a cluster of holes in some of said plates for converting high current arcs into low current arcs and for subsequent deionization of said low current arcs to effect final extinction thereof, said cluster extending from immediately adjacent the arc entrance zone of said chute to adjacent the venting zone thereof, the average spacing of said holes of said cluster immediately adjacent said arc entrance zone being considerably smaller than the diameter of high current arcs formed at said arc entrance zone and the average size of said holes of said cluster immediately adjacent said arc entrance zone being considerably smaller than the average spacing between hole centers.

16. An electric circuit interrupter comprising separable contacts for initiating an arc and an arc chute for receiving and extinguishing said arc, said chute comprising a plurality of spaced insulating plates arranged transversely with respect to the general direction of separation of said contacts, an arc receiving notch in some of sad plurality of plates, ribs forming an integral part of and projecting from the plane of said some of said plurality of plates for cooling and directing the products of arcing formed in said chute in the direction from the arc inception region to the exhaust region thereof, and a cluster of holes in some of said plurality of plates extending from the region of arc inception toward the exhaust end of the arc chute.

17. An electric circuit interrupter comprising separable contacts for initiating an arc and an arc chute for receiving and extinguishing said arc, said chute comprising a plurality of spaced insulating plates arranged transversely with respect to the general direction of separation of said contacts, an arc receiving notch in some of said plurality of plates, a pair of spaced ribs projecting from the plane of each of said some of said plurality of plates, and a cluster of holes in each of said some of said plurality of plates extending from the region of the apex of said notch into the space between said pair of ribs.

References Cited in the file of this patent

UNITED STATES PATENTS

| | | |
|---|---|---|
| 2,442,199 | Dickinson et al. | May 25, 1948 |
| 2,568,377 | Zajic | Sept. 18, 1951 |
| 2,616,006 | Frink | Oct. 28, 1952 |
| 2,644,048 | Frink et al. | June 30, 1953 |

FOREIGN PATENTS

| | | |
|---|---|---|
| 332,484 | Italy | Nov. 30, 1935 |
| 615,025 | Great Britain | Dec. 31, 1948 |